United States Patent
Van Nederkassel et al.

(10) Patent No.: US 12,209,581 B2
(45) Date of Patent: Jan. 28, 2025

(54) COMPRESSOR SYSTEM AND METHOD FOR SUPPLYING COMPRESSED GAS

(71) Applicant: ATLAS COPCO AIRPOWER, NAAMLOZE VENNOOTSCHAP, Wilrijk (BE)

(72) Inventors: Frederik Van Nederkassel, Wilrijk (BE); Anton Goethals, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 519 days.

(21) Appl. No.: 17/607,503

(22) PCT Filed: May 18, 2020

(86) PCT No.: PCT/IB2020/054681
§ 371 (c)(1),
(2) Date: Oct. 29, 2021

(87) PCT Pub. No.: WO2020/250056
PCT Pub. Date: Dec. 17, 2020

(65) Prior Publication Data
US 2022/0213881 A1    Jul. 7, 2022

(30) Foreign Application Priority Data
Jun. 12, 2019 (BE) .................................. 2019/5375

(51) Int. Cl.
*F04B 39/16* (2006.01)
*B01D 53/26* (2006.01)
*F04B 39/06* (2006.01)

(52) U.S. Cl.
CPC ............ *F04B 39/16* (2013.01); *B01D 53/261* (2013.01); *F04B 39/06* (2013.01); *B01D 2259/4009* (2013.01); *B01D 2259/65* (2013.01)

(58) Field of Classification Search
CPC ........ F04B 39/16; F04B 39/06; B01D 53/261; B01D 2259/4009; B01D 2259/65;
(Continued)

(56) References Cited

U.S. PATENT DOCUMENTS 5,087,178 A * 2/1992 Wells .................. F04C 29/0007
                                                              95/123
2003/0121271 A1   7/2003 Dinnage et al.
(Continued)

FOREIGN PATENT DOCUMENTS

CN    107970748 A    5/2018
EP    2309193 A1    4/2011
(Continued)

OTHER PUBLICATIONS

International Search Report and Written Opinion in corresponding PCT Application No. PCT/IB2020/054681, dated Jul. 31, 2020.
(Continued)

*Primary Examiner* — Robert A Hopkins
*Assistant Examiner* — Qianping He
(74) *Attorney, Agent, or Firm* — BACON&THOMAS,PLLC

(57) ABSTRACT

Compressor system provided with a compressor device with at least one compressor element with an outlet for compressed gas, an outlet line connected to this compressor device for the compressed gas, and a dryer connected to said outlet line of the type using a drying agent or desiccant for drying the compressed gas from the compressor system. The dryer is provided with a drying section and a regeneration section with an inlet and an outlet for a regeneration gas. A regeneration line is connected to the inlet of the regeneration section. The regeneration line includes a first heat exchanger for heating the regeneration gas. A secondary section of said first heat exchanger forms a condenser of a heat pump. An evaporator of the heat pump is provided in the compressor system.

15 Claims, 8 Drawing Sheets

(58) Field of Classification Search
CPC ....... B01D 3/007; B01D 53/265; F28D 20/00; F24F 11/86; F24F 2203/021; F24F 2203/1016; Y02B 30/52
USPC ............................................................ 95/39
See application file for complete search history.

(56) References Cited

U.S. PATENT DOCUMENTS

| | | | | |
|---|---|---|---|---|
| 2009/0007784 | A1* | 1/2009 | Vanderstraeten | B01D 53/06 95/119 |
| 2009/0049984 | A1* | 2/2009 | Vertriest | B01D 53/261 95/91 |
| 2016/0187011 | A1* | 6/2016 | Vandermeulen | F25B 13/00 62/271 |
| 2018/0154302 | A1* | 6/2018 | Vertriest | B01D 53/06 |
| 2023/0221014 | A1* | 7/2023 | Carlsson | B01D 53/263 62/271 |

FOREIGN PATENT DOCUMENTS

| | | |
|---|---|---|
| EP | 2493593 A2 | 9/2012 |
| EP | 3446770 A1 | 2/2019 |
| WO | 2019101542 A1 | 5/2019 |

OTHER PUBLICATIONS

First OA received in corresponding Chinese Appln. No. 202080039874.1 dated Jan. 10, 2024.

\* cited by examiner

COMPRESSOR SYSTEM AND METHOD FOR SUPPLYING COMPRESSED GAS

The present invention relates to a compressor system.

BACKGROUND OF THE INVENTION

Compressor systems are known that are provided with a compressor device, a outlet line for compressed gas, and a dryer of the type using a drying agent or desiccant to dry the compressed gas from the compressor device, connected to said outlet line, wherein the dryer is provided with a drying section and a regeneration section.

The drying section is provided with a drying agent for drying compressed gas being fed through it and it is provided with an inlet connecting to said outlet line of the compressor device and an outlet also serving as an outlet of the compressor system for delivering compressed and dried gas to a downstream network to which consumers of compressed gas can be connected.

When the compressed gas to be dried flows through the desiccant into the drying section, the drying agent takes up moisture from the compressed gas by adsorption or absorption.

In the regeneration section, as is known, drying agent is regenerated which has already been used for drying compressed gas and which is saturated or partially saturated with moisture extracted from the gas to be dried.

The drying agent is regenerated in the regeneration section by means of a regeneration gas that is being fed through it via an inlet and an outlet of said regeneration section.

For liquid-free compressor devices use can be made of what is known as a "heat of compression" dryer (HOC dryer), wherein the regeneration gas is taken directly from said outlet line of the compressor device, for example at the outlet of the compressor device.

The branched off regeneration gas has a sufficiently high temperature to absorb moisture from the drying agent to be regenerated.

A disadvantage of such a known device is that the regeneration gas has a high absolute humidity and that after regeneration the drying agent still contains a certain amount of moisture, so that, when it is used at a later stage to dry gas, its capacity to take up moisture has dropped so it will have it to be regenerated again sooner.

In addition, liquid-injected compressor devices do not lend themselves to the use of compression heat for regeneration because the temperature at the outlet of the compressor device will typically be much lower here, so that compressed gas would not or not sufficiently dry the drying agent to be regenerated.

Another disadvantage of liquid-injected compressor devices is that the compressed gas at the outlet of the compressor device contains a certain amount of oil or other liquid, which may contaminate the drying agent.

A solution to avoid contamination of the drying agent is to feed the entire compressed gas flow from the compressor device to the drying section, after the compressed gas has first been cooled and fed through a liquid separator.

Regeneration gas can then be branched off at the outlet of the drying section, which regeneration gas is heated by means of a heat exchanger, for instance with the aid of the heat of the compressed gas at the outlet of the compressor device or with the aid of the heat of the injected liquid.

A problem that arises with such an approach is the fact that, for the operation of the compressor device and the service life of the liquid, the temperature of the liquid at the outlet of the compressor device should be kept as low as possible, preferably below 80° C., while, in order to regenerate the drying agent properly, the temperature of the regeneration gas should preferably be higher than 100° C. and preferably even higher than 120° C.

SUMMARY OF THE INVENTION

The present invention aims at solving at least one of the said and/or other disadvantages.

For that purpose, the present invention relates to a compressor system provided with a compressor device with at least one compressor element with an outlet for compressed gas, a compressed gas outlet line connected to this compressor device, and a dryer of the type using a drying agent or desiccant for drying the compressed gas from the compressor device, wherein the dryer is provided with a drying section and a regeneration section with an inlet and an outlet for a regeneration gas, where a regeneration line is connected to the inlet of the regeneration section, and wherein in the said regeneration line a first heat exchanger is provided with a primary section through which the regeneration gas can be fed to heat the regeneration gas, characterized in that a secondary section of said first heat exchanger forms a condenser of a heat pump, wherein the evaporator of the heat is provided in the compressor device.

Using a heat pump has the advantage that the temperature of the regeneration gas is still raised sufficiently, using heat generated by the compressor device.

Another advantage is that the heat pump will dissipate heat, so there is no need for a separate cooler or heat exchanger to dissipate this heat or that it can be much smaller in size.

In a practical embodiment, said evaporator of the heat pump forms the secondary part of a second heat exchanger, wherein the primary section of the second heat exchanger is provided in the outlet line.

This means the heat of the compressed gas after compression will be used.

In another embodiment, the compressor device is an oil-injected compressor device, wherein oil is injected into the compressor element, wherein the outlet line includes an oil separator which includes an inlet and an outlet for compressed gas and an outlet for separated oil which is connected to the primary section of a second heat exchanger to direct the separated oil to the primary section of the second heat exchanger, wherein the secondary section of the second heat exchanger forms said heat pump evaporator.

Such an embodiment will use the heat of the oil after the oil has passed through the compressor device.

The operation of such a compressor system according to the invention is similar to the known compressor systems provided with a dryer wherein, to dry the compressed gas, this compressed gas is fed through a drying section of the dryer.

Said dryer may be designed in various ways and may include for instance a single casing that accommodates both the drying section and the regeneration section or may include two or more vessels of which at least one forms a drying section and at least one forms the regeneration section.

The invention also relates to a method for delivering compressed gas from a compressor device with at least one compressor element with an outlet for the compressed gas, wherein the compressed gas is fed through a drying agent in a drying section for drying this compressed gas, and wherein the drying agent is then regenerated in a regeneration section by means of a regeneration gas passing through this regeneration section, characterized in that the method includes the step of heating the regeneration gas before passing it through said regeneration section, with the aid of a heat pump wherein an evaporator of the heat pump is provided in said compressor device.

An advantage of such a method is that a sufficiently high temperature can be reached for the regeneration gas, so that all or almost all of the moisture from the drying agent in the regeneration section can be desorbed or extracted.

BRIEF DESCRIPTION OF THE DRAWINGS

With a view to better demonstrating the characteristics of the invention, a number of preferred alternatives of a compressor system in accordance with the invention as well as a method in accordance with the invention, for delivering compressed gas, with reference to the accompanying drawings in which.

DETAILED DESCRIPTION OF THE INVENTION

Figure 1:
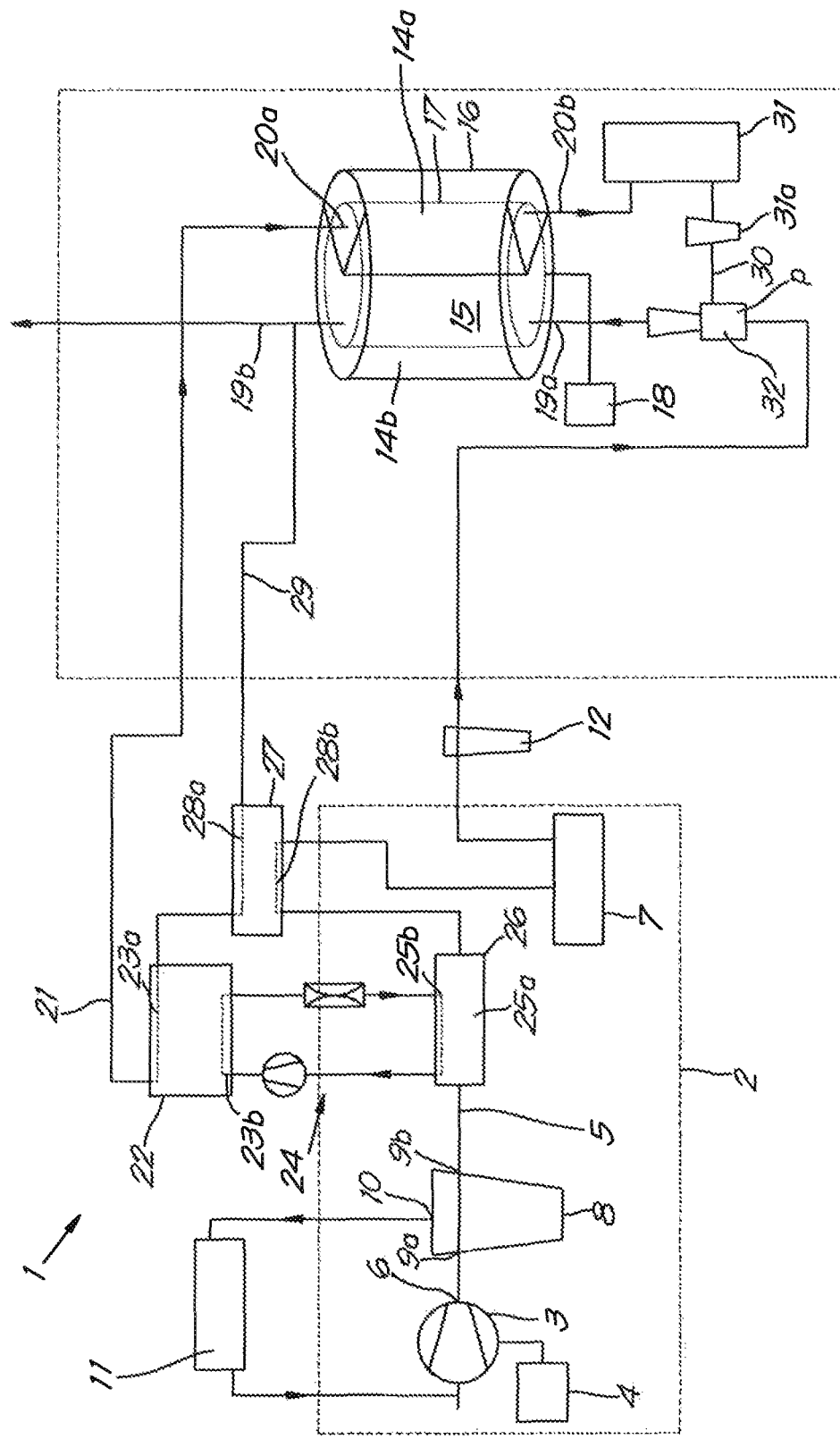
FIG. 1 schematically shows a compressor system in accordance with the invention.

The compressor system 1 schematically shown in FIG. 1 in accordance with the invention includes a compressor device 2 with in this case one compressor element 3 driven by a drive 4.

Drive 4 may be an electric motor, but can also be another type of drive such as a thermal motor, a turbine wheel or similar.

It is not ruled out that the compressor device 2 may include more than one compressor element 3 and/or more than one drive 4.

Compressor device 2 includes an outlet line 5 which is connected to outlet 6 of compressor element 3.

This outlet line 5 includes an aftercooler 7 for cooling the compressed gas, but this is not necessary for the invention. It is not ruled out that a liquid separator is provided downstream of aftercooler 7 or that aftercooler 7 itself is provided with a liquid separator.

As shown in FIG. 1, compressor device 2 is an oil-injected compressor device 2, wherein oil is injected into the compressor element 3. In accordance with the invention, this is not strictly necessary, since the invention may also be realized with an oil-free compressor device 2.

In said outlet line 5, upstream of said aftercooler 7, an oil separator 8 is provided having an inlet 9a and an outlet 9b for compressed gas and an outlet 10 for separated oil.

In this case, outlet 10 for separated oil is connected to an oil cooler 11, downstream of which the cooled oil can be injected back into the compressor device 2.

In addition, downstream of aftercooler 7 a filter 12 is provided in outlet line 5.

Compressor system 1 also includes what is known as a regeneration section 14a, which is part of a dryer 13, which in addition to the regeneration section 14a also includes a drying section 14b.

A drying agent 15 or desiccant is provided in the regeneration section as well as in the drying section.

In the example shown, dryer 13 is provided with a casing 16 which contains drying section 14b and regeneration section 14a.

Casing 16 includes a drum 17 containing the drying agent 15, which drum 17 is connected to drive gear 18 in such a way that drying agent 15 can be moved successively through drying section 14b and the regeneration section 14a.

Drying agent 15 in drying section 14b will be used to dry the compressed gas being fed through it, and in this instance drying section 14b is provided for this purpose with an inlet 19a connecting to said outlet line 5 of compressor device 2 and with an outlet 19b serving as outlet for supplying compressed and dried gas.

In this case, the full flow of compressed gas from said compressor element 3 is fed to inlet 19a of the drying section 14b.

In accordance with the invention, regeneration section 14a is provided with an inlet 20a and an outlet 20b and a regeneration line 21 connected to inlet 20a to pass a regeneration gas through the regeneration section 14a in order to regenerate wet drying agent 15, which is contained in the regeneration section 14a.

In this regeneration line 21, a first heat exchanger 22 is provided for heating the regeneration gas with a primary section 23a through which the regeneration gas is fed, wherein the secondary section 23b of this first heat exchanger 22 forms the condenser 23b of a heat pump 24.

Evaporator 25b of heat pump 24 is provided in the compressor device.

In the example of FIG. 1, the evaporator 25b forms the secondary section 25b of a second heat exchanger 26, of which the primary section 25a is provided in the outlet line 5.

The primary section 25a of the second heat exchanger 26 is provided between the oil separator 8 and the aftercooler 7.

Additionally, in the regeneration line 5, upstream of the first heat exchanger 22, a third heat exchanger 27 is provided with a primary section 28a through which the regeneration gas is fed.

The secondary section 28b of this third heat exchanger 27 is provided in the outlet line 5 downstream of the second heat exchanger 26 but, in this case, upstream of the aftercooler 7.

The temperature of the third heat exchanger 26 is lower than the temperature via the heat pump 24. After heating in the third heat exchanger 26, the regeneration gas will be heated further to a higher temperature using the heat pump 24.

This third heat exchanger 27 is optional and could therefore be omitted.

In the example shown, the regeneration line 21 is connected to output 19b of the drying section 14b via a branch line 29 for branching off regeneration gas at outlet 19b of the drying section 14b. In other words: Part of the dried compressed gas is used as regeneration gas.

Outlet 20b of regeneration section 14a is connected via a return line 30 to the outlet line 5 of the compressor device 2 at a point P near the inlet 19a of the drying section 14b.

This return line 30 includes a cooler 31 for cooling the regeneration gas after regeneration. In this case, a liquid separator 31a is provided downstream of the cooler 31 in order to separate condensed liquid.

Furthermore, in this case outlet line 5 is connected to the return line 30 via a venturi 32.

Instead of a venturi ejector, a so-called blower or booster could also be used to recombine the used regeneration gas with the gas to be dried.

The operation of compressor system 1 is very simple and as follows.

The compressor element 3 will compress gas, for instance air, in the usual way.

During operation, oil will be injected into the compressor element 3 for lubrication, cooling, and sealing.

The temperature of the gas and oil at the outlet 6 of the compressor element 3 will typically be around 80° C.

The compressed gas will pass through the outlet line 5 along oil separator 8 to separate the injected oil from the compressed gas.

The gas then passes through the primary section 25a of the second heat exchanger 26, through the secondary section 28b of the third heat exchanger 27 and through the aftercooler 7, wherein the compressed gas will cool down to about 30° C. and finally through the filter 12 to remove any residual impurities.

The outlet line 5 will pass on all the cooled and purified compressed gas to the inlet 19a of the drying section 14b of the dryer 13.

When passing through the drying section 14b, the drying agent 15 will absorb moisture from the gas. In other words: the drying agent 15 will become wet.

When the now dry gas leaves the drying section 14b, it will, for example, be transported to a consumer network which is not shown in the figure.

Part of this dry gas will be fed through branch line 29 to the regeneration line 21.

This so-called regeneration gas will pass through the primary section 28a of the third heat exchanger 27 and the primary section 23a of the first heat exchanger 22 to heat the regeneration gas.

The third heat exchanger 27 will heat up the regeneration gas by means of the hot compressed gas.

The first heat exchanger 22 will heat up the regeneration gas by means of the heat pump 24. In the process, heat pump 24 will extract heat from the hot compressed gas.

Said two heat exchangers 22, 27, will heat up the regeneration gas from about 30° C. to about 120° C.

Through the regeneration line 21, the gas is fed to the inlet 20a of regeneration zone 14a, where it will flow through moist drying agent 15 into regeneration zone 14a.

The regeneration gas will regenerate the drying agent 15, which means: extracting moisture from the moist drying agent 15 or the drying agent 15 itself will be dried.

Subsequently, drive gear 18 of the drum 17 will move the dried drying agent 15 to the drying section 14b, while at the same time wet drying agent 15 will end up in the regeneration section 14a.

The regeneration gas, which after passing through the regeneration section 14a contains moisture and has a temperature of approximately 75° C., will be fed through the return line 30 to the inlet 19a of the drying section 14b and thus be dried. It will pass through the cooler 31 and be cooled to approximately 30° C. before being recombined with the compressed gas from the compressor device 2 via the venturi 32.

Figure 2:
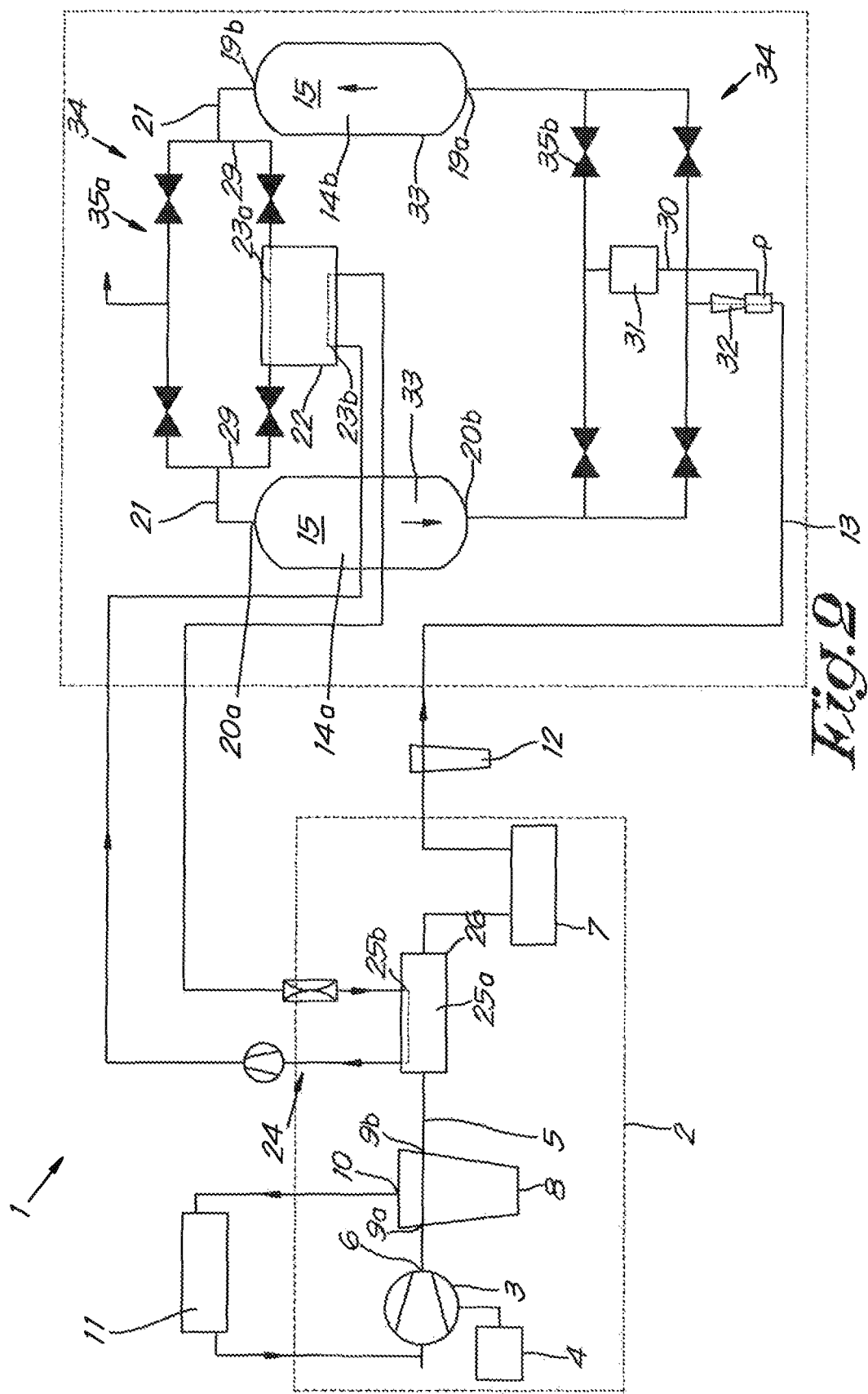
FIG. 2 shows an alternative of FIG. 1.

FIG. 2 shows an alternative according to FIG. 1, wherein in this case the dryer 13 is designed differently.

Instead of a rotating or revolving drum 17, the dryer now comprises a number of vessels 33 filled with the drying agent 15.

In the example, two vessels 33 are shown, but that may also be three, four or more vessels 33, of which at least one vessel 33 constitutes the drying section 14b and at least one vessel 33 constitutes he regeneration section 14a.

In addition to said vessels 33, the dryer 13 also includes a valves system 34 that connects the outlet line 5, the regeneration line 21 and in this case also at least a section of the return line 30 and the branch line 29 to said vessels 33.

Said valves system 34 comprises two separate blocks 35a, 35b.

Said valves system 34 is a system of different lines and valves which can be regulated in such a way that at any one time at least one vessel 33 is being regenerated, while the other vessels 33 are drying the compressed gas, wherein the control unit of the valves system 34 alternately regenerates the vessels 33.

The cooler 31, the venturi 32, the return line 30 and a section of the branch line 29 are integrated in the valves system 34, but this is not a precondition for the invention.

In addition, in the embodiment of FIG. 2, the third heat exchanger 27 is not included, nor is the liquid separator 31a.

Otherwise, the operation is similar to the operation of the compressor system 1 in FIG. 1 as described above.

Figure 3:
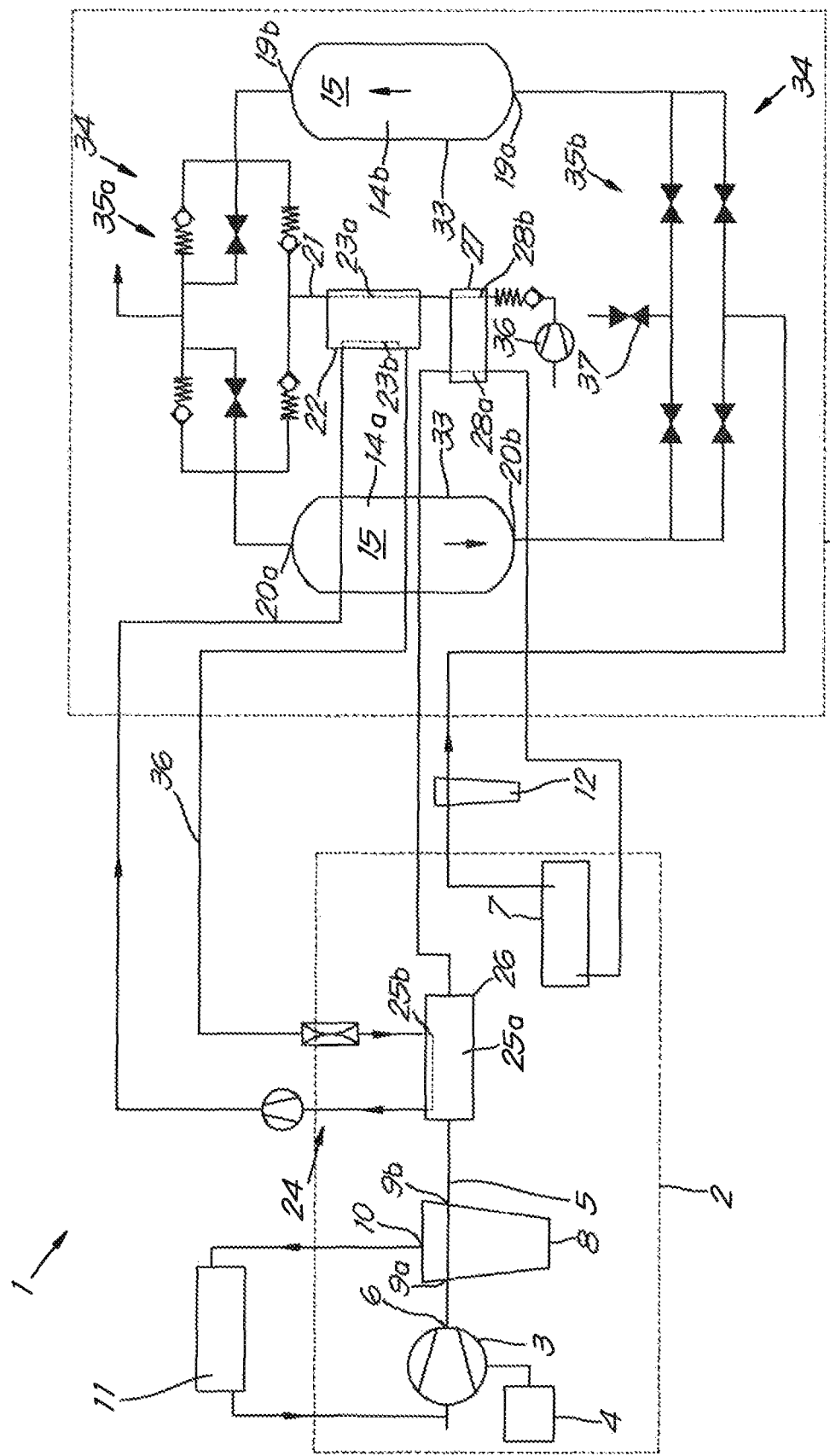
FIGS. 3 and 4 show alternatives of FIG. 2.

FIG. 3 shows an alternative of FIG. 2, wherein in this case the regeneration gas is not branched off from the dried, compressed gas, but comes from an external source 36.

Neither is the regeneration gas fed via a return line 30 to the inlet 19a of the drying section 14b, but will be disposed of or blown off after regeneration of the drying agent, for instance by means of a blow-off valve.

This embodiment does include the third heat exchanger 27.

Figure 4:
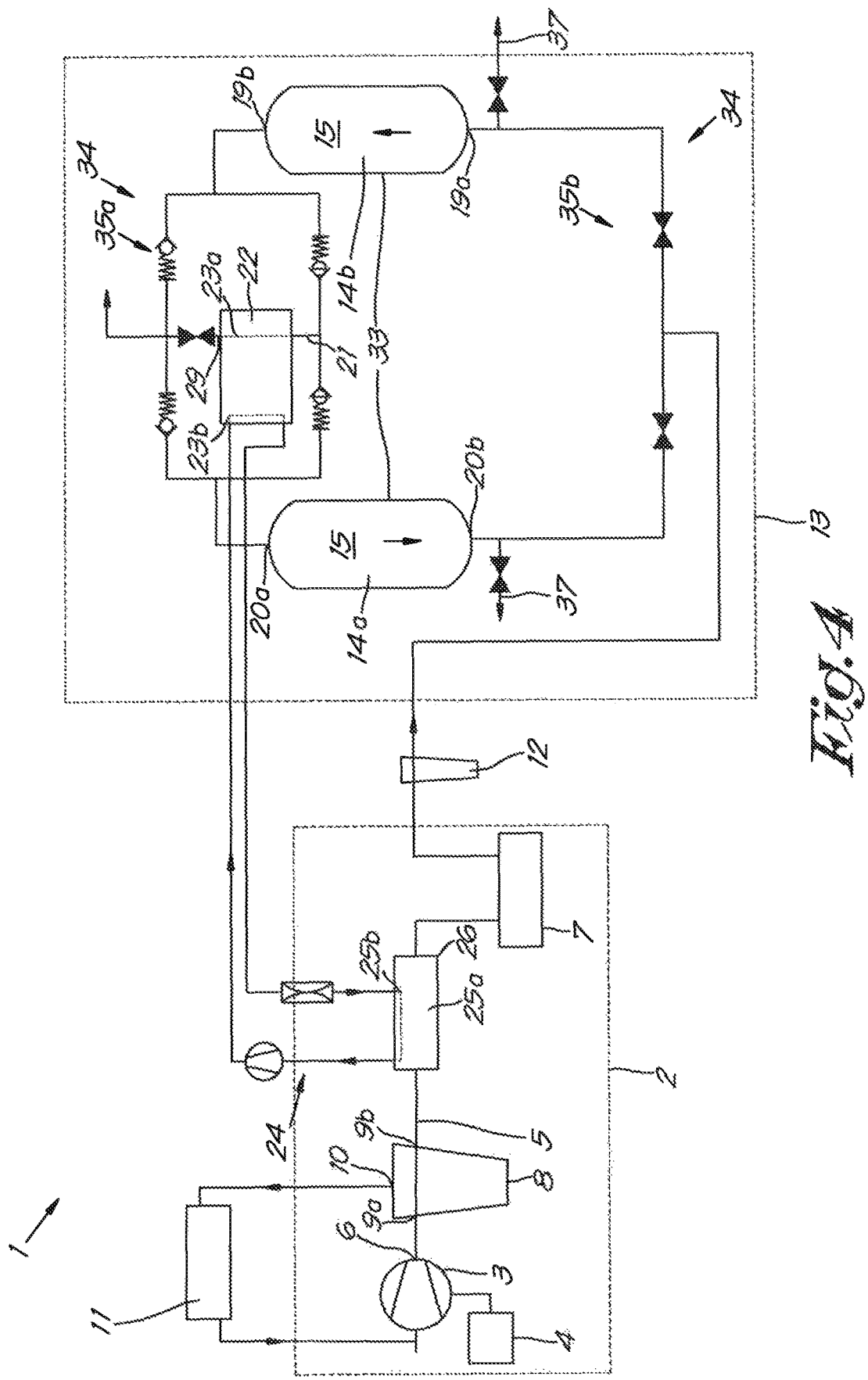

FIG. 4 shows yet another embodiment, wherein in this case the regeneration gas is branched off again at the outlet 19b of the drying section 14b, as in FIG. 2, but wherein the regeneration gas is blown off after regeneration, for instance by means of a blow-off valve 37, as in FIG. 3.

Again, the third heat exchanger 27, similar as in FIG. 2, is omitted.

Otherwise, the embodiments of FIGS. 3 and 4 are identical to FIG. 2.

Figure 5:
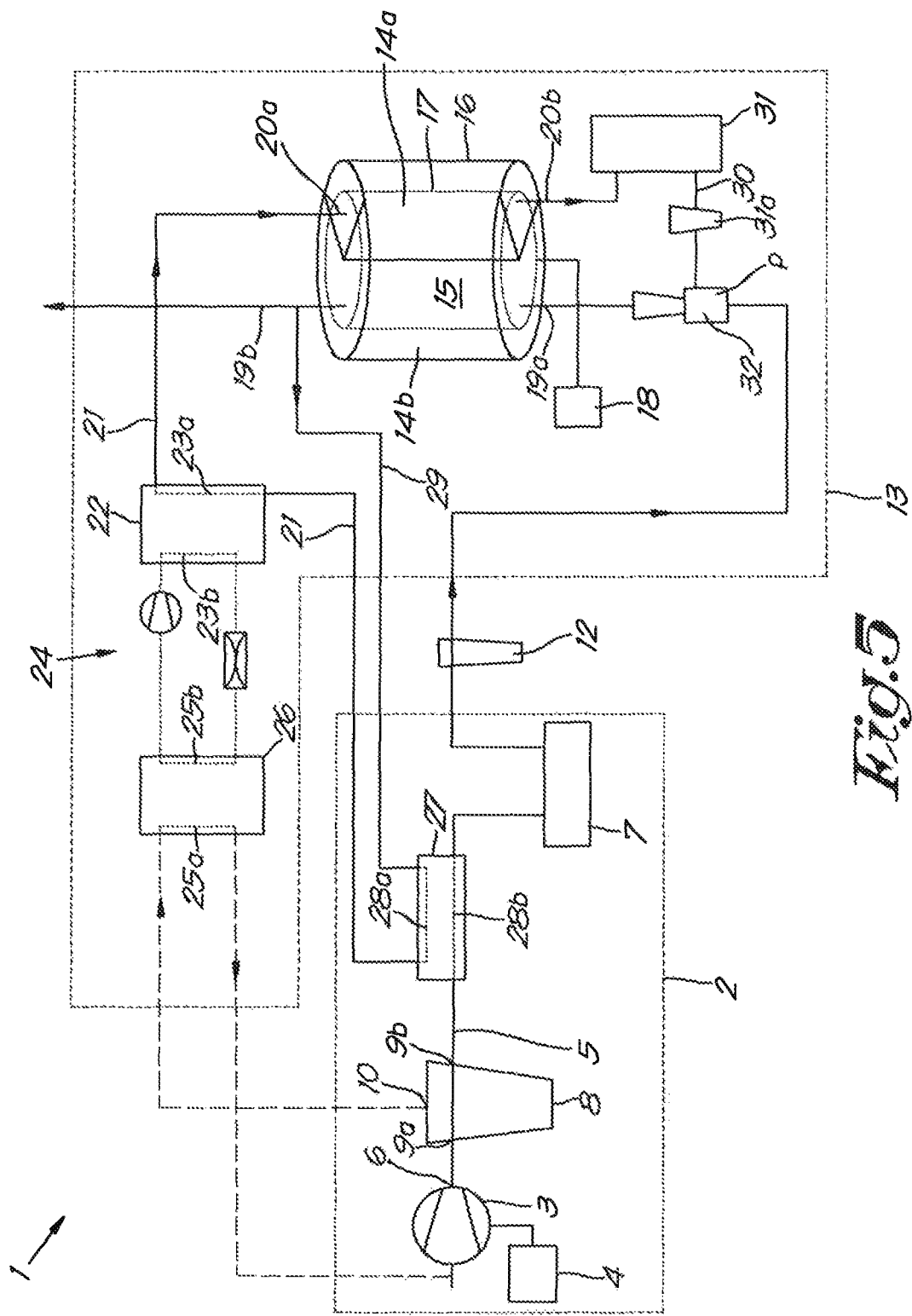
FIG. 5 schematically shows a compressor system in accordance with the invention.

FIG. 5 shows an alternative of FIG. 1, wherein in this case the primary section 25a of the second heat exchanger 26 is connected to the outlet 10 for separated oil from oil separator 8 to pass the separated oil to the primary section 25a of the second heat exchanger 26.

As in FIG. 1, the secondary section 25b of this second heat exchanger 26 is the evaporator of the heat pump 24.

The second heat exchanger 26 will heat up the regeneration gas by means of the heat pump 24. Here, the heat pump 24 will extract heat from the hot oil instead of from the hot compressed gas as shown in FIG. 1.

Otherwise, the operation is similar to FIG. 1.

Figure 6:
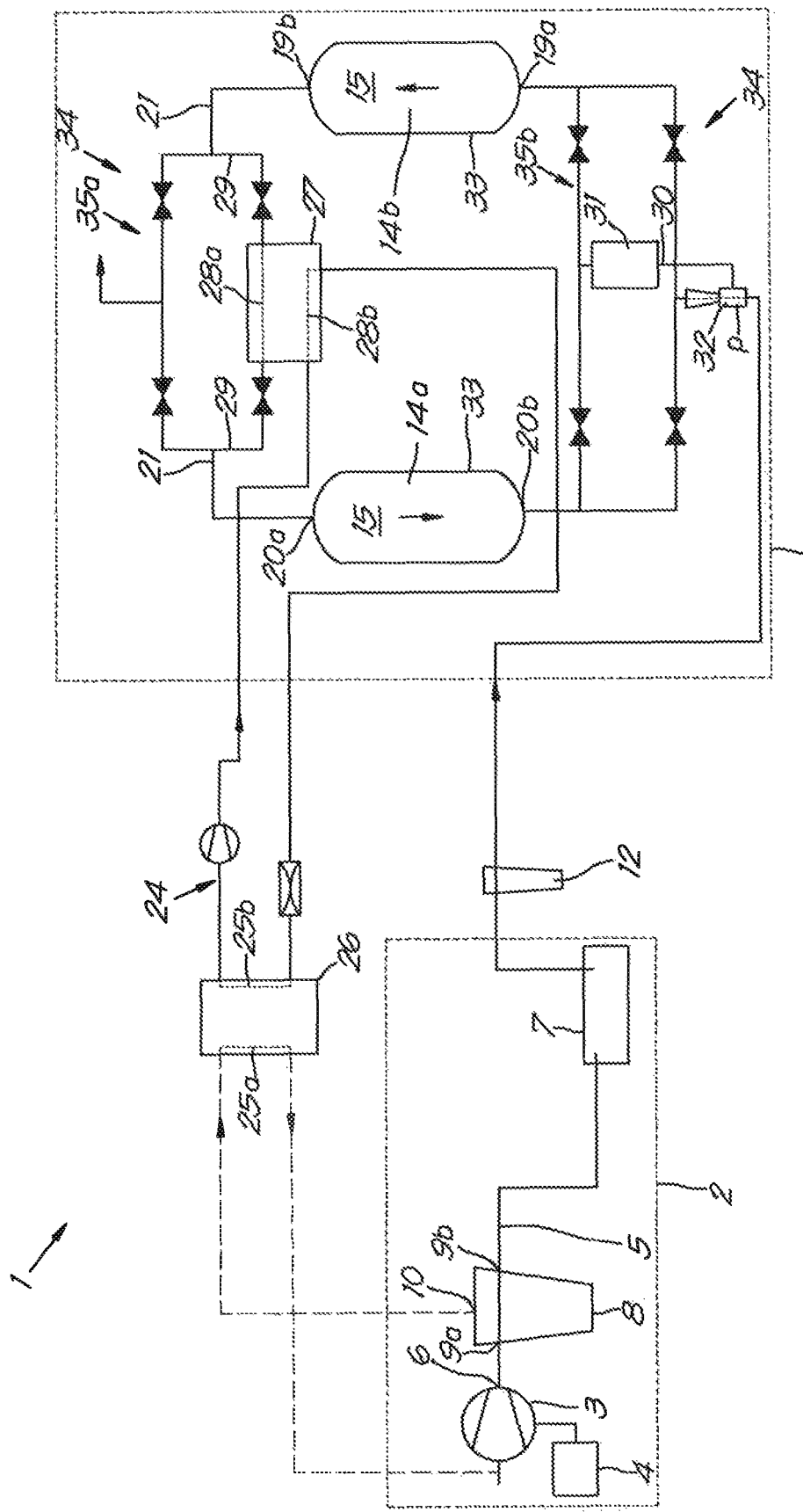
FIG. 6 shows an alternative embodiment of FIG. 5.

FIG. 6 shows an alternative of FIG. 5, wherein in this case the dryer 13 is designed as FIGS. 2-4.

Instead of a rotating or revolving drum 17, the dryer 13 now comprises vessels 33 filled with a drying agent 15.

In the example, two vessels 33 are shown, but that may also be three, four or more vessels 33, of which at least one vessel 33 constitutes the drying section 14b and at least one vessel 33 constitutes the regeneration section 14a.

In addition to said vessels 33, the dryer 13 also includes a valves system 34 that connects the outlet line 5, the regeneration line 21, the return line 30 and the branch line 29 to said vessels 33.

Said valves system 34 comprises two separate blocks 35a, 35b.

Said valves system 34 is, as in FIG. 2, a system of different lines and valves which can be regulated in such a way that at any one time at least one vessel 33 is being regenerated, while the other vessels 33 are drying the compressed gas, wherein the control unit of the valves system 34 alternately regenerates the vessels 33.

The cooler 31, the venturi 32, the return line 30 and a section of the branch line 29 are integrated in the valves system 34, but this is not a precondition for the invention.

The third heat exchanger 27 and the liquid separator 31a are not included.

Otherwise, the operation is similar to the operation of the device of FIG. 5.

Figure 7:
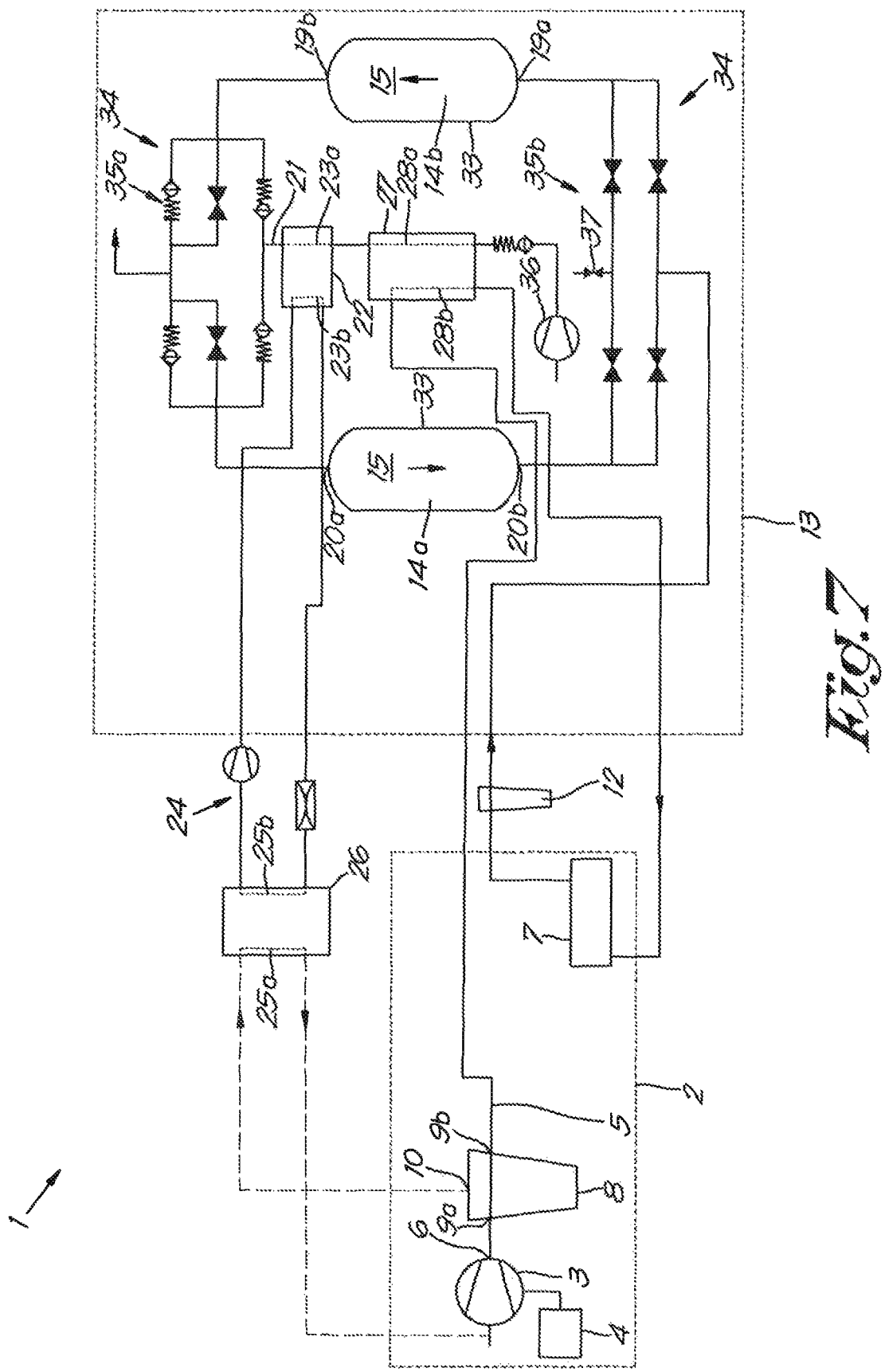
FIGS. 7 and 8 show alternatives of FIG. 6.

FIG. 7 shows an alternative of FIG. 6, wherein in this case the regeneration gas is not branched off from the dried, compressed gas, but comes from an external source 36, similar as in FIG. 3.

Neither is the regeneration gas fed via a return line 30 to the inlet 19a of the drying section 14b, but will be disposed of or blown off after regeneration of the drying agent 15, for instance by means of a blow-off valve 37.

The third heat exchanger 27 is included again as shown in FIG. 5.

Figure 8:
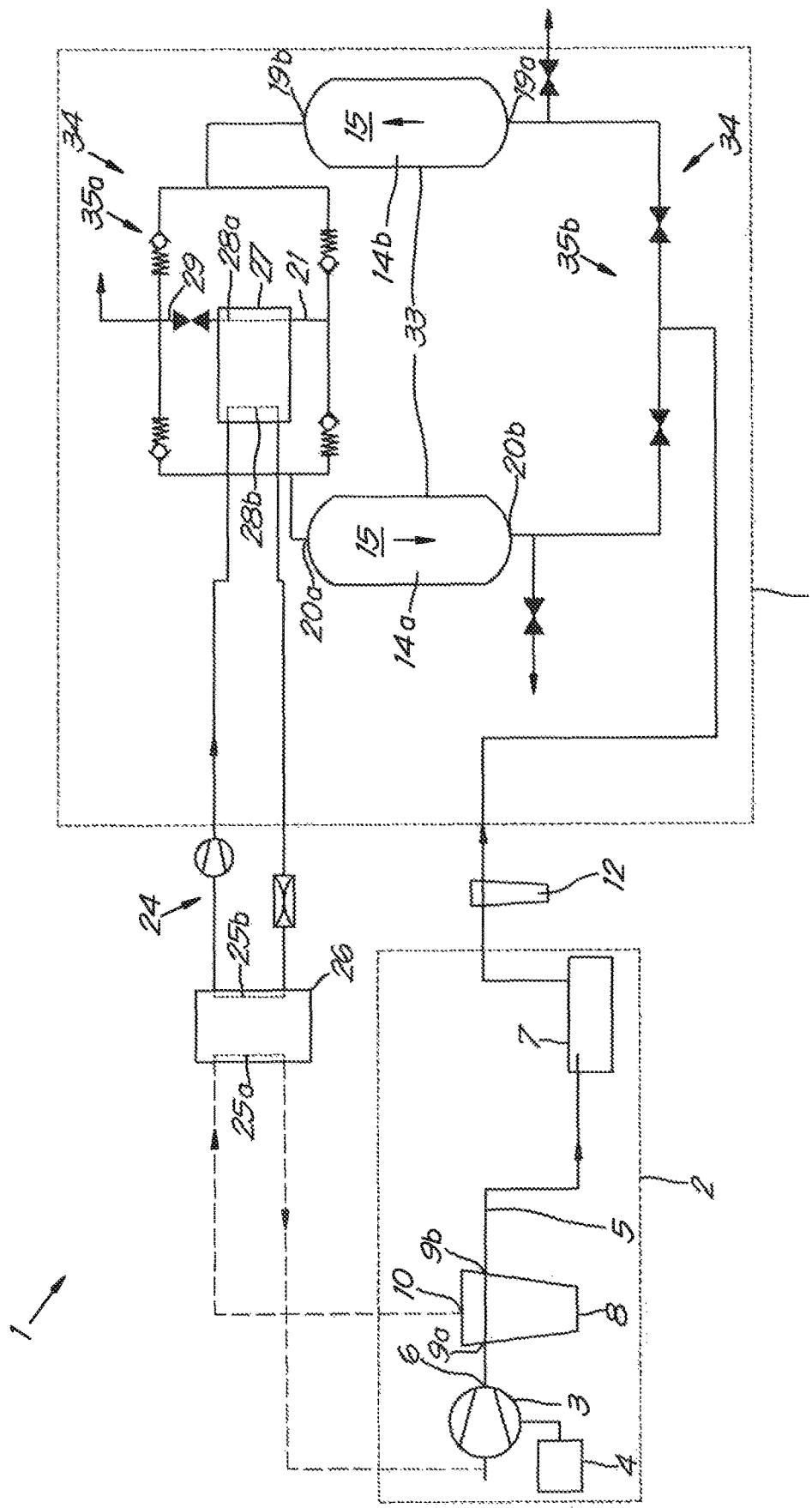

FIG. 8 shows yet another embodiment, wherein in this case the regeneration gas is branched off again at the outlet 19b of the drying section 14b, as in FIG. 6, but wherein the regeneration gas is blown off after regeneration, for instance by means of a blow-off valve 37, as in FIG. 7. This corresponds to the situation as shown in FIG. 4.

This embodiment too, does not include the third heat exchanger, as in FIG. 6.

Otherwise, the embodiments of FIGS. 7 and 8 are identical to FIG. 6.

It will be clear that the specific design of the valves system 34 in FIGS. 2-4 and 6-8 is not restrictive to the invention and that this system can be realized in many different ways.

It is possible that in addition to said heat exchanger 22 of the heat pump 24, an electric heater is included in the regeneration line 5 for heating the regeneration gas. This electric heater can be used when starting up compressor device 2, when there is not yet enough heat available or as a back-up if, for example, more heat is needed than compressor device 2 can supply.

The present invention is by no means limited to the embodiments described as examples and shown in the figures, but a similar compressor system and method based on the invention for providing compressed gas according to the various alternatives can be realized without going beyond the scope of the invention.

The invention claimed is:

1. A compressor system, comprising:
a compressor device with at least one compressor element with an outlet for compressed gas;
an outlet line connected to the outlet of the at least one compressor element;
a dryer connected to said outlet line, said dryer using a drying agent or desiccant for drying the compressed gas from the compressor device;
a heat exchanger having a primary section and a secondary section; and
a heat pump having an evaporator and a condenser,
wherein the dryer is provided with a drying section and a regeneration section with an inlet and an outlet for a regeneration gas,
wherein a regeneration line is connected to the inlet of the regeneration section,
wherein said regeneration line includes the primary section of the first heat exchanger for heating the regeneration gas,
wherein the secondary section of said first heat exchanger forms the condenser of the heat pump, and
wherein the evaporator of the heat pump is provided in the compressor device.

2. The compressor system according to claim 1, wherein said evaporator of the heat pump forms a secondary section of a second heat exchanger, wherein a primary section of the second heat exchanger is provided in the outlet line.

3. The compressor system according to claim 2, wherein in the regeneration line, upstream of the first heat exchanger, a third heat exchanger is provided with a primary section through which the regeneration gas is fed and of which the secondary section is located in the outlet line, downstream of the second heat exchanger.

4. The compressor system according to claim 1, wherein the compressor device is an oil-injected compressor device, wherein oil is injected into the compressor element, wherein the outlet line includes an oil separator which includes an inlet and an outlet for compressed gas and an outlet for separated oil.

5. The compressor system according to claim 4, wherein the outlet for the separated oil is connected to the primary section of a second heat exchanger to feed the separated oil to the primary section of the second heat exchanger, wherein the secondary section of the second heat exchanger forms said evaporator of the heat pump.

6. The compressor system according to claim 5, wherein in the regeneration line, upstream of the first heat exchanger, a third heat exchanger is provided with a primary section through which the regeneration gas is fed and of which the secondary section is located in the outlet line.

7. The compressor system according to claim 1, wherein the compressor system is configured in such a way that the complete flow of compressed gas from said compressor element is fed to an inlet of said drying section.

8. The compressor system according to claim 1, wherein at an outlet of the drying section a branch line is provided which connects to the regeneration line for branching off regeneration gas at the outlet of the drying section.

9. The compressor system according to claim 1, wherein an output of the regeneration section is connected via a return line to the outlet line of the compressor device at a point near an input of the drying section.

10. The compressor system according to claim 9, wherein said return line includes a cooler and a liquid separator.

11. The compressor system according to claim 9, wherein the return line is connected to the outlet line via a venturi.

12. The compressor system according to claim 1, wherein the dryer is provided with a casing comprising the drying section and the regeneration section, while the casing comprises a drum which contains the drying agent, which drum is connected to drive gear in such a manner that the drying agent can successively be fed through the drying section and the regeneration section.

13. The compressor system according to claim 1, wherein the dryer comprises a number of vessels filled with the drying agent, of which at least one vessel forms the drying section and at least one vessel forms the regeneration section, wherein the dryer also comprises a valves system connecting the outlet line and the regeneration line to said vessels, wherein said valves system is configured in such a manner that at any one time at least one vessel is being regenerated, while the other vessels are drying the compressed gas, while the control unit of the valves system alternately regenerates the vessels.

14. The compressor system according to claim 1, wherein in the outlet line an aftercooler is included with a liquid separator.

15. The compressor system according to claim 1, wherein the regeneration line includes an electric heater for heating the regeneration gas.

\* \* \* \* \*